US010756572B2

(12) United States Patent
Ansari et al.

(10) Patent No.: US 10,756,572 B2
(45) Date of Patent: Aug. 25, 2020

(54) WIRELESS CHARGING PAD HAVING COOLANT ASSEMBLY (71) Applicant: Lear Corporation, Southfield, MI (US)

(72) Inventors: Ajmal Imran Ansari, Canton, MI (US); Arthur Hurlburt, Canton, MI (US)

(73) Assignee: Lear Corporation, Southfield, MI (US)

( * ) Notice: Subject to any disclaimer, the term of this patent is extended or adjusted under 35 U.S.C. 154(b) by 100 days.

(21) Appl. No.: 15/159,930

(22) Filed: May 20, 2016

(65) Prior Publication Data
US 2017/0338023 A1    Nov. 23, 2017

(51) Int. Cl.
H02J 50/00    (2016.01)
B60L 53/12    (2019.01)
(Continued)

(52) U.S. Cl.
CPC ............ *H02J 50/005* (2020.01); *B60L 53/12* (2019.02); *H01F 27/025* (2013.01);
(Continued)

(58) Field of Classification Search
CPC .... H01F 27/085; H01F 27/365; H01F 27/025; H01F 27/10; H01F 27/362; H01F 27/22;
(Continued)

(56) References Cited

U.S. PATENT DOCUMENTS 5,408,209 A    4/1995  Tanzer et al.
5,545,966 A    8/1996  Ramos et al.
(Continued)

FOREIGN PATENT DOCUMENTS

CN    201898434 U    7/2011
CN    201985749 U    9/2011
(Continued)

OTHER PUBLICATIONS

State Intellectual Property Office of People's Republic of China, First Office Action and translation for Chinese Patent Application No. 201710049789.3 dated Dec. 26, 2018.
(Continued)

*Primary Examiner* — Richard Isla
*Assistant Examiner* — Manuel Hernandez
(74) *Attorney, Agent, or Firm* — Brooks Kushman P.C.

(57) ABSTRACT

A charging pad for an electric vehicle includes a coolant assembly, a magnetics assembly, and an electronics assembly. The coolant assembly has a top wall and a bottom wall which form a coolant channel for circulating coolant through the coolant assembly. The magnetics assembly is configured to wirelessly receive power from a charging source induction coil arrangement facing the magnetics assembly. The magnetics assembly is adjacent the bottom wall of for heat generated by the magnetics assembly to thermally conduct from the bottom wall into coolant in the coolant channel. The electronics assembly is configured to convert the power wirelessly received by the magnetics assembly into electrical power for charging the electric vehicle. The electronics assembly is arranged adjacent the top wall for heat generated by the electronics assembly to thermally conduct from the top wall into coolant in the coolant channel.

17 Claims, 4 Drawing Sheets (51) Int. Cl.
  *H01F 27/36* (2006.01)
  *H01F 27/02* (2006.01)
  *H02J 50/10* (2016.01)
  *H01F 27/08* (2006.01)
  *H01F 27/10* (2006.01)
  *H01F 38/14* (2006.01)
  *H02J 7/00* (2006.01)
  *H02J 7/02* (2016.01)
  *H01F 27/22* (2006.01)
  *H02J 50/70* (2016.01)

(52) U.S. Cl.
  CPC .......... *H01F 27/085* (2013.01); *H01F 27/10* (2013.01); *H01F 27/362* (2013.01); *H01F 27/365* (2013.01); *H01F 38/14* (2013.01); *H02J 7/0042* (2013.01); *H02J 7/025* (2013.01); *H02J 50/10* (2016.02); *H01F 27/22* (2013.01); *H02J 50/70* (2016.02)

(58) Field of Classification Search
  CPC ......... H01F 38/14; H02J 7/025; H02J 7/0042; H02J 7/0027; H02J 50/10; H02J 5/005; H02J 17/00; H02J 50/005; B60L 11/182
  USPC .......................................... 320/108; 307/104
  See application file for complete search history.

(56) References Cited

U.S. PATENT DOCUMENTS

| | | | |
|---|---|---|---|
| 5,917,307 A | 6/1999 | Watanabe et al. | |
| 6,175,212 B1* | 1/2001 | Oguri | H01F 27/2876 320/108 |
| 6,384,703 B1 | 5/2002 | Ramos et al. | |
| 6,396,241 B1* | 5/2002 | Ramos | B60L 11/1816 174/47 |
| 8,723,366 B2 | 5/2014 | Fiorello et al. | |
| 8,933,594 B2 | 1/2015 | Kurs et al. | |
| 8,947,186 B2 | 2/2015 | Kurs et al. | |
| 9,041,502 B2 | 5/2015 | Ansari et al. | |
| 9,071,061 B2 | 6/2015 | Boys et al. | |
| 9,076,593 B2 | 7/2015 | Sharaf et al. | |
| 9,787,138 B2* | 10/2017 | Ichikawa | H01F 38/14 |
| 9,854,709 B2 | 12/2017 | Niizuma | |
| 2008/0164844 A1* | 7/2008 | Kato | H01F 5/003 320/114 |
| 2009/0096413 A1 | 4/2009 | Partovi et al. | |
| 2010/0109604 A1 | 5/2010 | Boys et al. | |
| 2011/0148351 A1 | 6/2011 | Ichikawa | |
| 2012/0319647 A1 | 12/2012 | Itabashi et al. | |
| 2013/0038276 A1 | 2/2013 | Raedy | |
| 2013/0113423 A1 | 5/2013 | Baarman et al. | |
| 2013/0181797 A1* | 7/2013 | Hickox | B60L 53/12 336/61 |
| 2013/0285463 A1 | 10/2013 | Covic et al. | |
| 2014/0111021 A1 | 4/2014 | Nakamura | |
| 2014/0111151 A1 | 4/2014 | Keeling et al. | |
| 2014/0232331 A1* | 8/2014 | Stamenic | B60L 11/182 320/108 |
| 2014/0320090 A1 | 10/2014 | Keeling et al. | |
| 2014/0327391 A1 | 11/2014 | Niederhauser et al. | |
| 2015/0091511 A1 | 4/2015 | Ichikawa et al. | |
| 2015/0102684 A1 | 4/2015 | Tanaka et al. | |
| 2015/0123465 A1 | 5/2015 | Ichikawa | |
| 2015/0162120 A1* | 6/2015 | Ren | H01F 38/14 307/104 |
| 2015/0197155 A1 | 7/2015 | Lu et al. | |
| 2015/0334875 A1 | 11/2015 | Topolewski et al. | |
| 2015/0364924 A1 | 12/2015 | Yuasa | |
| 2015/0367739 A1 | 12/2015 | Boeser et al. | |
| 2016/0347188 A1 | 12/2016 | Nakahara et al. | |
| 2017/0253129 A1* | 9/2017 | Garcia | B60L 11/182 |
| 2017/0274778 A1* | 9/2017 | van Boheemen | H02J 50/10 |
| 2018/0154781 A1* | 6/2018 | Ansari | B60L 3/00 |
| 2020/0139828 A1* | 5/2020 | Laemmle | H02J 50/12 |

FOREIGN PATENT DOCUMENTS

| | | |
|---|---|---|
| CN | 104956568 A | 9/2015 |
| DE | 112015000805 T5 | 11/2016 |
| GB | 2529630 A | 3/2016 |
| JP | 2012244722 A | 12/2012 |
| WO | 2012031721 A2 | 3/2012 |
| WO | 2015122248 A1 | 8/2015 |

OTHER PUBLICATIONS

State Intellectual Property Office of People's Republic of China, Second Office Action and translation for Chinese Patent Application No. 201710049789.3, dated Aug. 5, 2019.

\* cited by examiner

WIRELESS CHARGING PAD HAVING COOLANT ASSEMBLY

TECHNICAL FIELD

The present invention relates to wireless charging pads.

BACKGROUND

A wireless charging pad receives power in free space (e.g., via a wireless electric-magnetic field) from a charging source. The charging pad is integral to vehicles that use utility power to charge their traction batteries. Such vehicles include electric vehicles and plug-in hybrid vehicles.

SUMMARY

A charging pad includes a coolant assembly and a magnetics assembly. The coolant assembly has a first wall and a second wall with a coolant channel formed between the walls. The coolant channel is for circulating coolant through the coolant assembly. The magnetics assembly is arranged adjacent the first wall of the coolant assembly for heat generated by the magnetics assembly to thermally conduct from the first wall into coolant in the coolant channel.

The charging pad may further include an electronics assembly. The electronics assembly is arranged adjacent the second wall of the coolant assembly to absorb heat generated by the electronics assembly and to thermally conduct heat from the second wall into coolant in the coolant channel.

The magnetics assembly is configured to wirelessly receive power from a charging source and the electronics assembly is configured to convert AC power wirelessly received by the magnetics assembly into DC electrical power for battery charging and/or traction.

The charging pad may further include an electromagnetic shield between at least one of the first wall of the coolant assembly and the magnetics assembly and the second wall of the coolant assembly and the electronics assembly. A purpose of the shield is to protect the electronics assembly from the intense magnetic field produced by the magnetic assembly. The shield, most often of metallic material, is employed when the first and second walls of the coolant assembly are made of thermally conductive plastic or the like. In the case of the first and/or second walls of the coolant assembly being made of metallic material, the shielding function is provided by the metallic first and/or second walls of the coolant assembly and the impetus for employing the shield may diminish.

The coolant assembly may further include a coolant inlet for coolant to enter into the coolant channel and a coolant outlet for coolant to exit out of the coolant channel.

The first wall and/or the second wall of the coolant assembly may be made of thermally conductive plastic or metallic materials.

The magnetics assembly may be attached to the first wall of the coolant assembly and the electronics assembly may be attached to the second wall of the coolant assembly.

The charging pad may further include a housing connected to the coolant assembly with the magnetics assembly arranged adjacent the first wall of the coolant assembly within the housing. In this case, the magnetics assembly may be attached to the housing.

The magnetics assembly includes an induction coil arrangement and may include potting material filing in space between the induction coil arrangement and the first wall of the coolant assembly.

The electronics assembly may include a printed circuit board having electric and electronic components arranged thereon and may include a thermal interface material layer arranged between the second wall of the coolant assembly and the printed circuit board.

A charging pad for an electric vehicle or plug-in hybrid vehicle includes a coolant assembly, a magnetics assembly, and an electronics assembly. The coolant assembly has a top wall and a bottom wall with a coolant channel formed between the walls. The coolant channel is for circulating coolant through the coolant assembly. The magnetics assembly is configured to wirelessly receive power from a charging source induction coil arrangement facing the magnetics assembly. The magnetics assembly is adjacent the bottom wall of the coolant assembly for absorbing heat generated by the magnetics assembly and to thermally conduct the heat from the bottom wall into coolant in the coolant channel. The electronics assembly is configured to convert AC power wirelessly received by the magnetics assembly into DC electrical power for charging the vehicle traction battery. The electronics assembly is arranged adjacent the top wall of the coolant assembly for heat generated by the electronics assembly to thermally conduct from the top wall into coolant in the coolant channel. An electromagnetic shield is between at least one of the bottom wall of the coolant assembly and the magnetics assembly and the top wall of the coolant assembly and the electronics assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a receiving coil to achieve power transfer.

An electric vehicle such as a battery electric vehicle (BEV) solely uses electrical power from a traction battery for propulsion. An electric vehicle such as a hybrid electric vehicle (HEV) or a plug-in hybrid electric vehicle (PHEV) uses an internal combustion engine and/or an external utility power to charge its traction battery. Herein, "electric vehicle" refers to any type of vehicle that uses electrical power from a traction battery for vehicle propulsion. An electric vehicle is not limited to an automobile and may include motorcycles, carts, scooters, and the like. By way of example, a target device is described herein in the form of an electric vehicle. Other target devices that may be at least partially powered using a chargeable energy storage device (e.g., a battery) are also contemplated (e.g., electronic devices such as personal computing devices, mobile phones, tablet computers, and the like).

Figure 1:
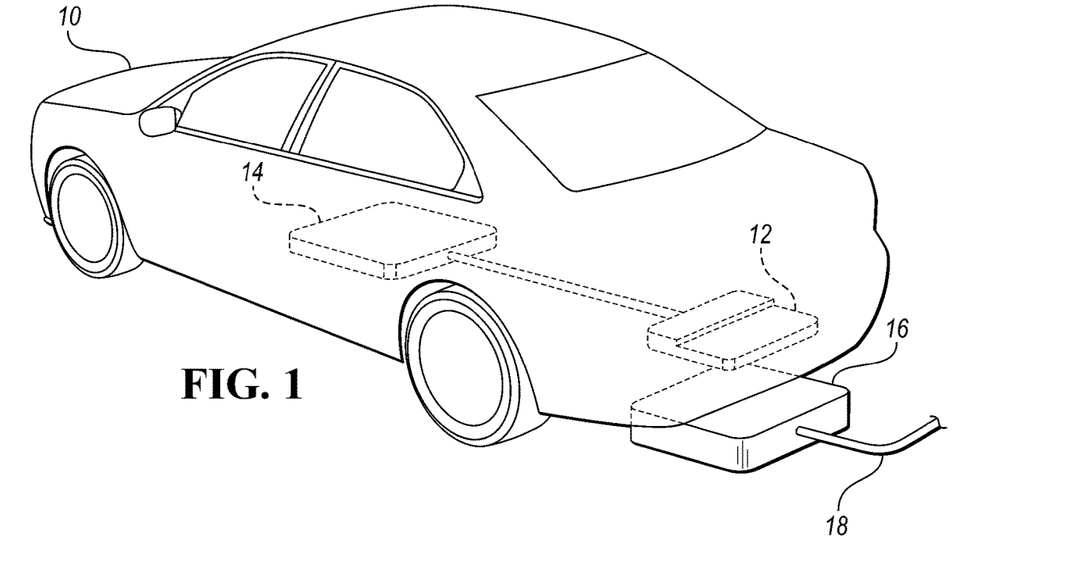
FIG. 1 illustrates a schematic diagram of an electric vehicle, plug-in hybrid vehicle, or hybrid vehicle having a charging pad for wirelessly receiving power from a charging source for charging the vehicle traction battery.

Referring now to FIG. 1, a schematic diagram of an electric vehicle 10 having a charging pad 12 for wirelessly receiving power from a charging source for charging the vehicle is shown. Charging pad 12 includes a magnetics assembly (e.g., an induction coil arrangement) for wirelessly receiving power from the charging source. Charging pad 12 further includes an electronics assembly for converting the power wirelessly received by the magnetics assembly into electrical power. Electrical power output from the electronics assembly is provided to a battery 14 of the vehicle for charging the battery.

During the charging operation, vehicle 10 is parked in a position in which charging pad 12 faces a remotely located wireless charge unit 16 of the charging source. Wireless charge unit 16 generates power from electrical current received via a transmission line 18 from the charging source. Wireless charge unit 16 has an induction coil arrangement for wirelessly transferring the power. The induction coil arrangement of wireless charge unit 16 wirelessly transfers the power to the magnetics assembly of charging pad 12 during the charging operation. The magnetics assembly of charging pad 12 interacts with the induction coil arrangement of wireless charge unit 16 via a region of the electromagnetic field generated by the induction coil arrangement of the wireless charge unit. In this regard, charging pad 12 and wireless charge unit 16 are arranged so that the magnetics assembly of the charging pad faces the induction coil arrangement of the wireless charge unit when the charging pad faces the wireless charge unit. For instance, in the situation shown in FIG. 1, the magnetics assembly of charging pad 12 is oriented to face downward from the body of vehicle 10 to face wireless charge unit 16 located on or under the floor beneath the vehicle body.

Figure 2:
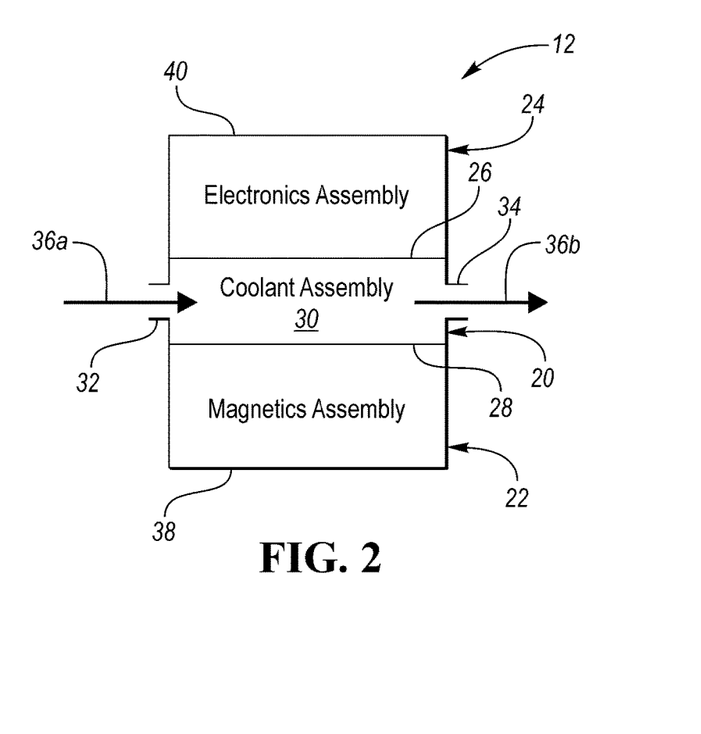
FIG. 2 illustrates a block diagram of the charging pad, the charging pad having a coolant assembly including top and bottom walls with a coolant channel formed between the walls, an electronics assembly arranged adjacent the top wall of the coolant assembly, and a magnetics assembly arranged adjacent the bottom wall of the coolant assembly.

Referring now to FIG. 2, with continual reference to FIG. 1, a block diagram of charging pad 12 is shown. Charging pad 12 includes a coolant assembly 20, a magnetics assembly 22, and an electronics assembly 24. Coolant assembly 20 includes a top wall 26 and a bottom wall 28 and a chamber, manifold, channel 30 (e.g., "coolant channel 30") formed between the top and bottom walls.

Coolant channel 30 is for providing a path for coolant to flow through charging pad 12. Coolant assembly 20 further includes a coolant inlet 32 and a coolant outlet 34. Coolant enters into coolant channel 30 through coolant inlet 32 and egresses out of coolant channel 30 through coolant outlet 34. For example, coolant circulates through coolant channel 30 in the direction indicated by arrows 36a and 36b.

Electronics assembly 24 is arranged adjacent top wall 26 of coolant assembly 20 and magnetics assembly 22 is arranged adjacent bottom wall 28 of the coolant assembly. Coolant is circulated through coolant channel 30 via a pump or the like (not shown) for use in cooling magnetics assembly 22 and electronics assembly 24. That is, unheated coolant flows into coolant channel 30 through coolant inlet 32, heat from magnetics assembly 22 and electronics assembly 24 thermally conducts through bottom and top walls 28 and 26, respectively, into coolant flowing through coolant channel 30 and heats the coolant, and the heated coolant flows out of coolant channel 30 through coolant outlet 34. The coolant may include any fluid or liquid known for use in facilitating such cooling such as water, ethylene glycol-water mixture, etc.

Top wall 26 of coolant assembly 20 conducts heat from electronics assembly 24 into the coolant flowing through coolant channel 30. Likewise, bottom wall 28 of coolant assembly 20 conducts heat from magnetics assembly 22 into the coolant flowing through coolant channel 30. Top and bottom walls 26 and 28 absorb heat from electronics assembly 24 and magnetics assembly 22, respectively, for conduction into the coolant flowing through coolant channel 30 as the top and bottom walls are of thermally conductive plastic, for example. The flowing coolant carries the thermal energy out of the charging pad for dissipation into the ambient by heat exchangers/radiators (not shown).

Charging pad 12 further includes a housing 38 and a cover 40. Housing 38 meets at opposing sides of bottom wall 28 of coolant assembly 20 and is opened-ended at the location of the bottom wall. Bottom wall 28 thus acts as a side of housing 38. Magnetics assembly 22 is arranged adjacent bottom wall 28 within housing 38. Housing 38 is made of a plastic or the like (i.e., non-metallic) so as to not impede the wireless power transfer from the wireless charge unit to magnetics assembly 22. Similarly, cover 40 meets with opposing sides of top wall 26 of coolant assembly 20 and is opened-ended at the location of the top wall. Top wall 26 thus acts as a side of cover 40. Electronics assembly 24 is arranged adjacent top wall 26 within cover 40. Cover 40 may be made of a plastic or metal.

As indicated above, magnetics assembly 22 faces an external wireless charge unit to wirelessly receive power from an induction coil arrangement of the wireless charge unit. The wireless charge unit may be located at, above, or below the ground level. Charging pad 12, when attached to a vehicle body, is oriented so that magnetics assembly 22 faces downward from the vehicle body to face the wireless charge unit. As such, magnetics assembly 22 is located at the "bottom" of charging pad 12 and electronics assembly 24 is located at the "top" of charging pad 12 and coolant assembly 20 is intermediately located between magnetics assembly 22 and electronics assembly 24. In this way, top wall 26 of coolant assembly 20 is the "top" wall of the coolant assembly and bottom wall 28 of coolant assembly 20 is the "bottom" wall of the coolant assembly. Likewise, the bottom side of housing 38 is the bottom most portion of charging pad 12 whereas the top side of cover 40 is the top most portion of charging pad 12. The block diagram of FIG. 2 is illustrated in accordance with this arrangement of "top" and "bottom."

Magnetics assembly 22 generates heat as a result of wirelessly receiving power from the wireless charge unit. Electronics assembly 24 converts AC power received by magnetics assembly 22 into DC electrical power. Electronics assembly 24 generates heat as a result of its operation in converting the AC power received from magnetics assembly 22 into DC electrical power. The heat generated by magnetics assembly 22 and electronics assembly 24 is to be dissipated for charging pad 12 to function properly.

Coolant assembly 20 is a liquid cooling system for charging pad 12 which provides efficient simultaneous cooling of magnetics assembly 22 and electronics assembly 24. In this regard, coolant assembly 20 is formed of a thermally conductive plastic body (i.e., thermally conductive plastic top and bottom walls 26 and 28) with coolant channel 30 running through the thermally conductive plastic body. The thermally conductive plastic body is non-magnetic and hence does not induce eddy current losses. The use of thermally conductive plastic material for top and bottom walls may require use of dedicated shield(s) to reduce or limit the EMI interference between magnetic field produced by magnetics assembly 22 and electronics assembly 24.

As described, coolant channel 30 is formed between top and bottom walls 26 and 28 of coolant assembly 20 with liquid coolant flowing through the coolant channel. Seals are provided as needed to keep magnetics assembly 22 and electronics assembly 24 isolated from the coolant. Top and bottom walls 26 and 28 of coolant assembly 20 are made of thermally conductive plastic to allow thermal energy to transfer from electronics assembly 24 and magnetics assembly 22, respectively, into the coolant in coolant channel 30. In order to improve thermal contact between electronics assembly 24 and top wall 26 of coolant assembly 20 and between magnetics assembly 22 and bottom wall 28 of the coolant assembly, use may be made of thermal interface materials to fill small air voids and gaps inherent to solid-to-solid contact.

Figure 3A:
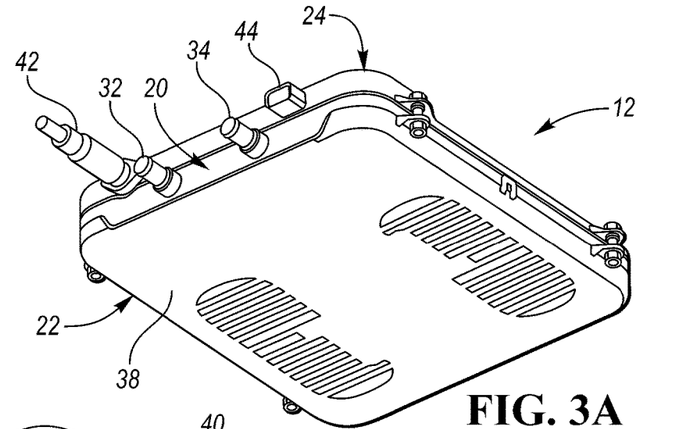
FIG. 3A illustrates an isometric view of the charging pad from a bottom side of a housing of the charging pad adjacent the magnetics assembly.
Figure 3B:
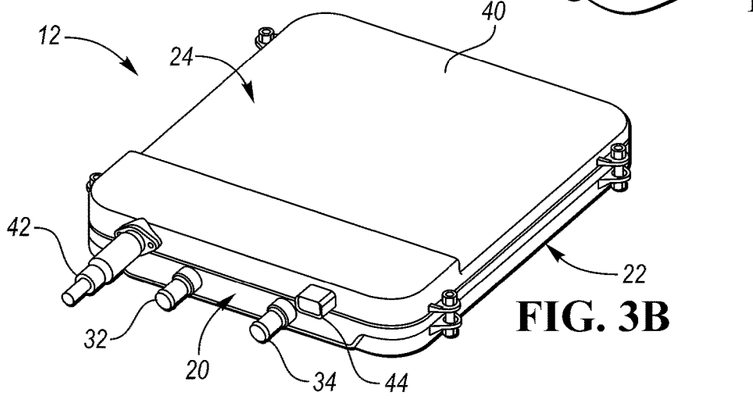
FIG. 3B illustrates an isometric view of the charging pad from a top side of a cover of the charging pad adjacent the electronics assembly.
Figure 3C:
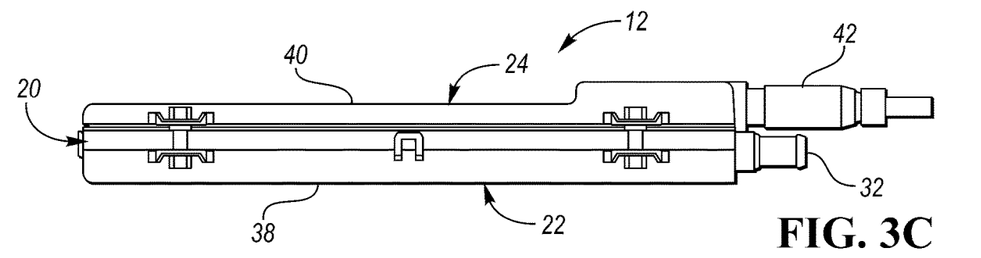
FIG. 3C illustrates a side view of the charging pad.
Figure 3D:
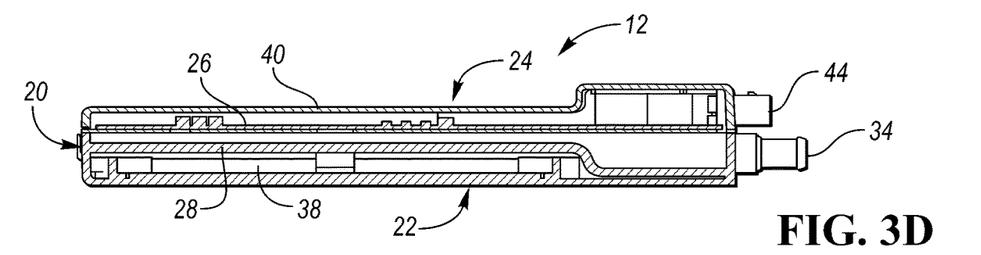
FIG. 3D illustrates a sectional side view of the charging pad.

Referring now to FIGS. 3A, 3B, 3C, and 3D, with continual reference to FIG. 2, charging pad 12 will be described in further detail. FIG. 3A illustrates an isometric view of charging pad 12 from the bottom side of housing 38. As described, magnetics assembly 22 is arranged between bottom side 28 of coolant assembly 20 and housing 38. FIG. 3B illustrates an isometric view of charging pad 12 from the top side of cover 40. As described, electronics assembly 24 is arranged between top side 26 of coolant assembly 20 and cover 40. FIG. 3C illustrates a side view of charging pad 12; and FIG. 3D illustrates a sectional side view of the charging pad.

As shown in FIG. 3A, the bottom side of housing 38 includes thermal fins for allowing air flow between magnetics assembly 22 and the environment external to charging pad 12 through the housing. In this way, some of the heat generated by magnetics assembly 22 may radiate and convect away from the magnetics assembly through housing 38.

As shown in FIGS. 3A, 3B, 3C, and 3D, electronics assembly 24 includes an electric output port 42 and a control port 44. Electric outlet port 42 and control port 44 extend from electronics assembly 24 out through cover 40. Electric outlet port 42 outputs the electrical power (e.g., DC electrical power) generated by electronics assembly 24. Electronics assembly 24 generates this electrical power from the power wirelessly received by magnetics assembly 22. Control port 44 communicates input and output control/data signals and the like to and from electronics assembly 24 in regards to the operation of the electronics assembly.

Coolant inlet 32 and coolant outlet 34 of coolant channel 30 of coolant assembly 20 are shown in FIGS. 3A, 3B, 3C, and 3D. As noted, unheated coolant enters coolant channel 30 through coolant inlet 32, circulates through coolant channel 30 and becomes heated from heat generated by magnetics assembly 22 and electronics assembly 24, and the heated coolant egresses out of coolant channel 30 through coolant outlet 34.

Figure 4A:
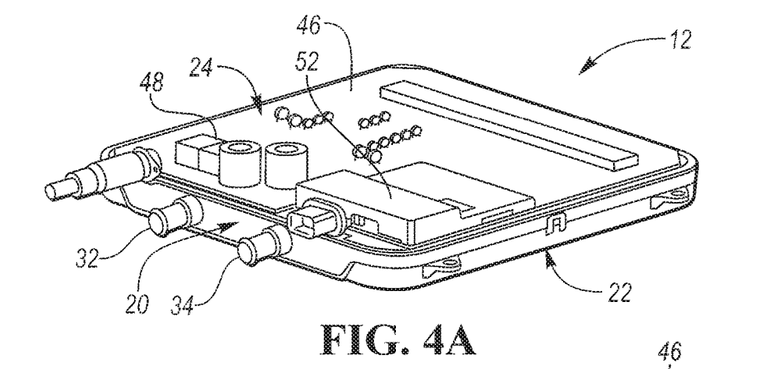
FIG. 4A illustrates the charging pad with the cover removed therefrom and with the electronics assembly arranged on the top wall of the coolant assembly.
Figure 4B:
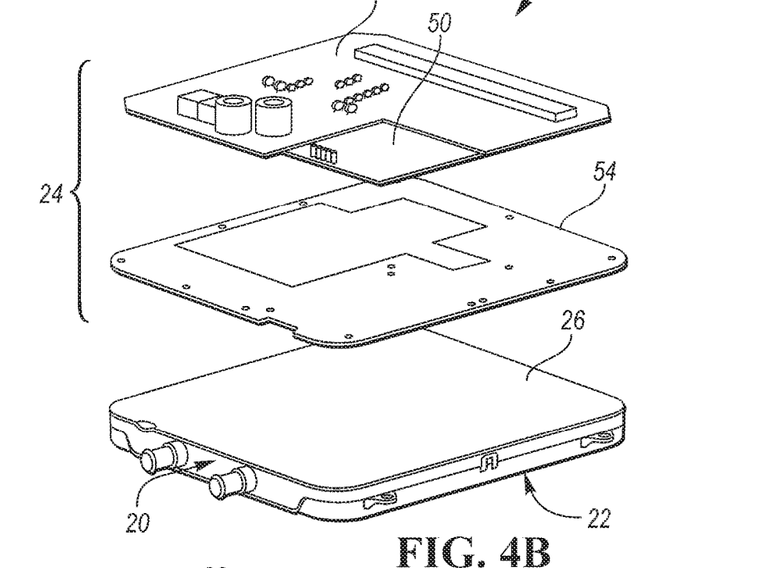
FIG. 4B illustrates an exploded view of the electronics assembly apart from the top wall of the coolant assembly.

Referring now to FIGS. 4A and 4B, with continual reference to FIGS. 2 and 3D, electronics assembly 24 of charging pad 12 will be described in further detail. FIG. 4A illustrates charging pad 12 with cover 40 removed therefrom and with electronics assembly 24 arranged on top wall 26 of coolant assembly 20. FIG. 4B illustrates an exploded view of electronics assembly 24 apart from top wall 26 of coolant assembly 20.

As shown in FIGS. 4A and 4B, electronics assembly 24 includes a printed circuit board (PCB) 46 having electric components 48 and a control board 50 having a control circuit assembly 52 arranged thereon. Electric components 48 (e.g., diodes, MOSFET switches, inductors, etc.) function to convert the AC power wirelessly received by magnetics assembly 22 into DC electrical power. This electrical power may be conveyed through electric outlet port 42 to a battery for charging the battery. Control circuit assembly 52 is configured to control the operation of electronic components 48 pursuant to control signals provided to the control circuit assembly through control port 44.

Electronics assembly 24 further includes a thermal interface material layer 54. Thermal interface material layer 54 is arranged between (i) PCB 46 and control board 50 and (ii) top wall 26 of coolant assembly 20. Thermal interface material layer 54 functions to absorb heat from electric components 48 and distribute the heat across the area of the thermal interface material layer for distribution to top wall 26 of coolant assembly 20. The heat conducts through top wall 26 into coolant flowing through coolant channel 30. A purpose of thermal interface material layer 54 is to reduce thermal contact resistance between (i) PCB 46 and control board 50 and (ii) top wall 26 of coolant assembly 20. In case top wall 26 of coolant assembly 20 is made of metallic material, such as aluminum, for shielding purposes, thermal interface material layer 54 also provides an electrical isolation barrier between PCB 46 and top wall 26 and between control board 50 and top wall 26.

FIGS. 4A and 4B illustrate a configuration in which electronics assembly 24 is mounted on top wall 26 of coolant assembly 20. In this configuration, PCB 46 and control board 50 are arranged on thermal interface layer 54 which is arranged on top wall 26 of coolant assembly 20. Cover 40 may then be provided to simply "cover" electronics assembly 24. As such, in this configuration, coolant assembly 20 functions as a base block for building electronics assembly 24 thereon in constructing charging pad 12.

Figure 5:
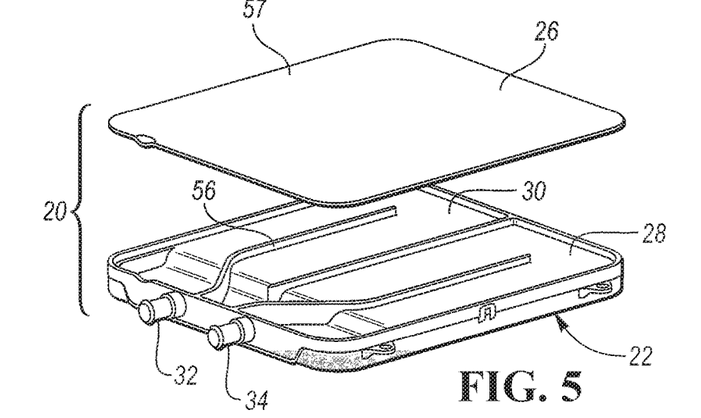
FIG. 5 illustrates an exploded view of the coolant assembly.

Referring now to FIG. 5, with continual reference to FIGS. 2 and 3D, an exploded view of coolant assembly 20 is shown. Top wall 26 and bottom wall 28 of coolant assembly 20 are shown apart from one another in the exploded view of FIG. 5. Coolant channel 30 runs between top and bottom walls 26 and 28. Coolant channel 30 includes flow diverters and baffles 56 for directing the flow of coolant. Flow diverters and baffles 56 of coolant channel 30 are formed on the interior side of bottom wall 28 of coolant assembly 20. Coolant inlet 32 and coolant outlet 34 are formed on a side of bottom wall 28 of coolant assembly 20. Flow diverters and baffles 56 as well as other flow diverters and baffles could be formed on the interior side of top wall 26 of coolant assembly 20. Likewise, coolant inlet 32 and/or coolant outlet 34 could be formed on a side of top wall 26 of coolant assembly 20.

As described, top and bottom walls 26 and 28 of coolant assembly 20 are of thermally conductive plastics or metals. Charging pad 12 further includes an electromagnetic interference (EMI) shield 57. EMI shield 57 is a metallic layer which functions to prevent electromagnetic (EM) fields from magnetics assembly 22 extending into electronic assembly 24. In this way, EMI shield 57 prevents EMI of electronics assembly 24 by magnetics assembly 22. In one configuration, EMI shield 57 is arranged on the exterior side of top wall 26 of coolant assembly 20 as indicated in FIG. 5. In this configuration, when electronics assembly 24 is arranged against the top wall 26, the electronics assembly further includes an electrical insulator layer (not shown). With reference to FIGS. 4A and 4B, in this configuration, electronic assembly 24 is stacked on top wall 28 in this order: PCB 46 and control board 50 are arranged on thermal interface layer 54; the thermal interface layer is arranged on the electrical insulator layer; the electrical insulator layer is arranged on EMI shield 57; and the EMI shield is arranged on the exterior side of top wall 26 of coolant assembly 20.

In another configuration, EMI shield 57 is alternately or additionally arranged on the exterior side of bottom wall 28 of coolant assembly 20. EMI shield 58 is provided in this configuration to also prevent EMI of electronics assembly 24 by magnetics assembly 22.

Figure 6A:
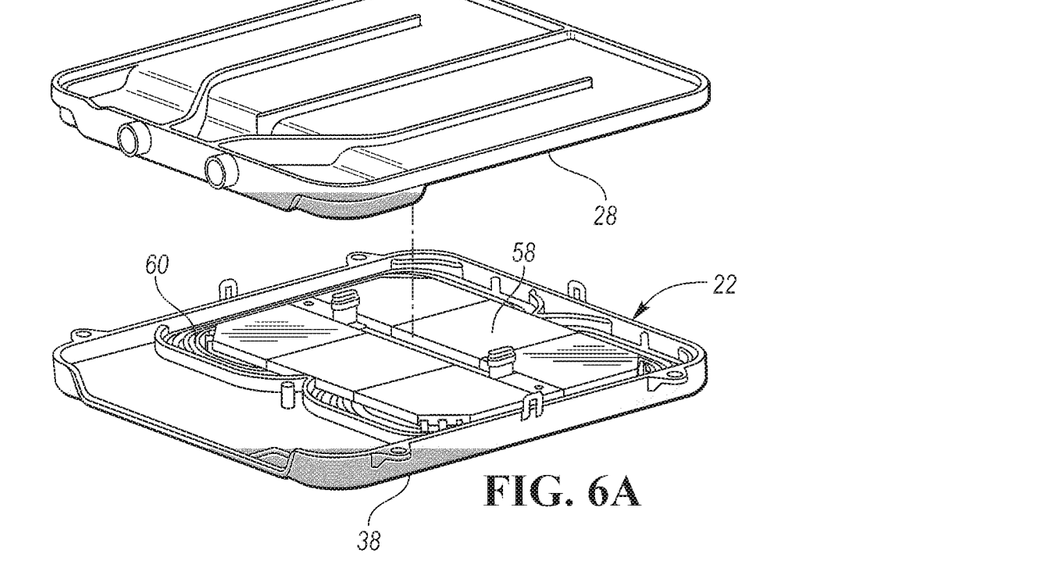
FIG. 6A illustrates an exploded view of the bottom wall of the coolant assembly and the magnetics assembly arranged on an interior side of the housing.
Figure 6B:
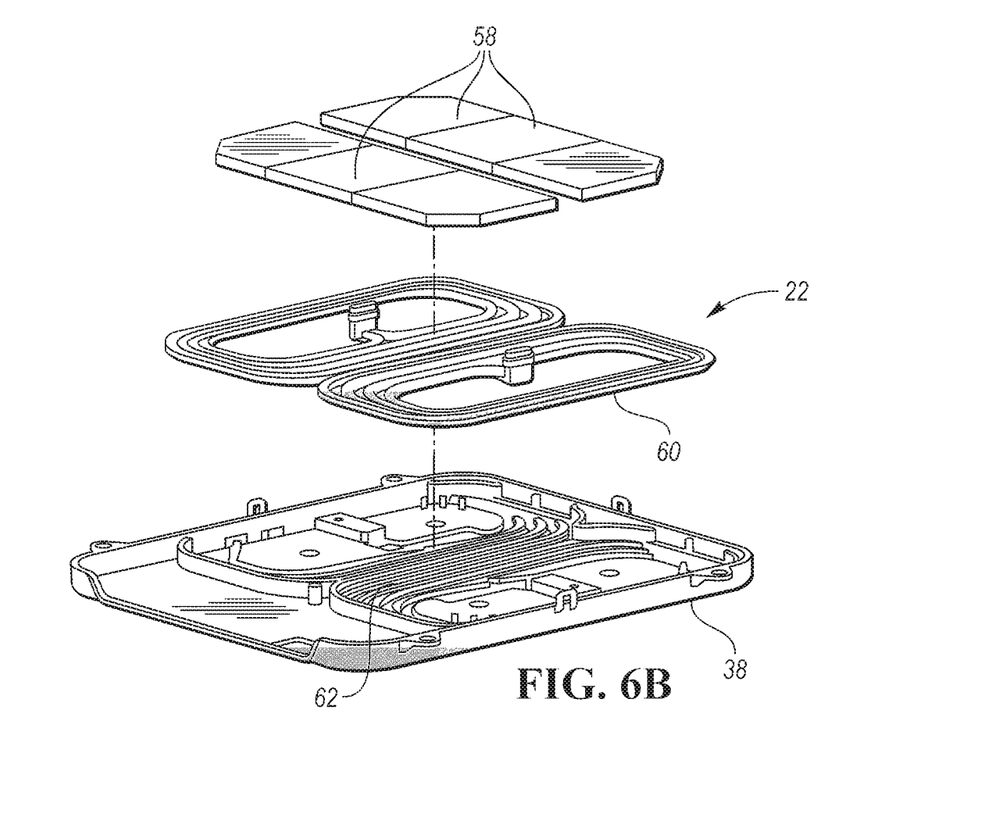
FIG. 6B illustrates an exploded view of the magnetics assembly and the housing.

Referring now to FIGS. 6A and 6B, with continual reference to FIGS. 2 and 3D, magnetics assembly 22 will be described in further detail. FIG. 6A illustrates bottom wall 28 of coolant assembly 20 and magnetics assembly 22 arranged on an interior side of housing 38. FIG. 6B illustrates an exploded view of magnetics assembly 22 and housing 38.

Magnetics assembly 22 includes one or more ferrite tiles 58 and an induction coil arrangement 60. Induction coil arrangement 60 includes a coil winding wound in loops. Ferrite tiles 58 are placed over the coil winding of induction coil arrangement 60.

In the configuration shown in FIGS. 6A and 6B, magnetics assembly 22 is supported on the interior side of housing 38. The interior side of housing 38 includes a plurality of tracks 62 for receiving the coil winding of induction coil arrangement 60 therein. Tracks 62 extend in a step-like fashion away from the interior side of housing 38. Accordingly, coil turns of the coil winding of induction coil arrangement 60 placed within tracks 62 also extend in a step-like fashion away from the interior side of housing 38. Thus, when housing 38 is connected to bottom wall 28 of coolant assembly 20, a step-like varied amount of empty space exists between the coil winding of induction coil arrangement 60 and the exterior side of bottom wall 28.

Thus, in the configuration shown in FIGS. 6A and 6B, magnetics assembly 22 further includes potting material (not shown). The potting material fills in the empty space between the coil winding of induction coil arrangement 60 and the exterior side of bottom wall 28 of coolant assembly 20. The potting material provides heat transfer from induction coil arrangement 60 to bottom wall 28 of coolant assembly 20. The potting material also provides electrical isolation and mechanical support to induction coil arrangement 60 against bottom wall 28 of coolant assembly 20. The potting material may be any material known in the art suitable for any such purposes, (for example, a filled epoxy or filled silicone). Potting material may also be provided over ferrite tiles 58 to fill in any empty space between the tiles and the exterior side of bottom wall 28. In sum, the potting material acts as: (a) a thermal conductor of heat between the components of magnetics assembly 22 and bottom wall 28 of coolant assembly 20; (b) an adhesive to retain the components of magnetics assembly 22 in place; (c) an electrical insulator between adjacent coil turns of the coil winding of induction coil arrangement 60, between the coil winding of induction coil arrangement 60 and ferrite tiles 58, and between ferrite tiles 58 and bottom wall 28 of coolant assembly 20 (in particular, between ferrite tiles 58 and an EMI shield sandwiched between the ferrite tiles and bottom wall 28); and (d) a vibration damping material.

In an alternative configuration, magnetics assembly 22 is supported on the exterior side of bottom wall 28 of coolant assembly 20. In this configuration, the exterior side of bottom wall 28 includes tracks for receiving the coil winding of induction coil arrangement 60. Ferrite tiles 58 are recessed within bottom wall 28 and the coil winding of induction coil arrangement 60 is wound in the tracks on the exterior side of bottom wall 28. In this configuration, housing 38 may then be provided to simply "cover" magnetics assembly 22. As such, in this configuration, coolant assembly 20 functions as a base block for building magnetics assembly 22 thereon.

Potting material can also be used on electronics assembly 24 for providing better electrical isolation, preventing moisture ingress, and reducing creepage and clearance distance requirements.

As described herein, in one variation, top and bottom walls 26 and 28 of coolant assembly 20 are made of thermally conductive plastic. In other variations, one or both of top and bottom walls 26 and 28 are made of metallic material(s). The choice of material depends on the overall design objectives and design constraints. In case of thermally conductive plastic top and bottom walls 26 and 28 a separate metallic electromagnetic compatibility (EMC) shield such as EMI shield 57 is employed. In case of metallic top and/or bottom walls 26 and 28, separate EMC shield may not be required but electrical isolation between electrical assembly 24 and top wall 26 and magnetics assembly 22 and bottom wall 28 will be necessary. Thermal interface material and potting material may serve the purpose of electrical isolation.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:
1. A charging pad for an electric vehicle, comprising:
a coolant assembly having a top wall and a bottom wall with a coolant channel formed between the top wall and the bottom wall, the coolant channel for circulating coolant through the coolant assembly;
a housing connected to the coolant assembly, the housing having an interior side spaced apart from and facing the bottom wall of the coolant assembly, the interior side including a plurality of tracks thereon facing toward the bottom wall of the coolant assembly, the tracks being concentric tracks having a common center and ascending, outward relative to the common center, in a step-like fashion away from the interior side and toward the bottom wall of the coolant assembly; and a magnetics assembly configured to wirelessly receive power from a charging source induction coil arrangement facing the magnetics assembly, the magnetics assembly including an induction coil arrangement having a plurality of coil windings, the magnetics assembly arranged within the housing to be adjacent the bottom wall of the coolant assembly for heat generated by the magnetics assembly to thermally conduct through the bottom wall of the coolant assembly and into coolant in the coolant channel, and the magnetics assembly attached to and placed directly on the interior side of the housing with the coil windings received in the tracks on the interior side of the housing whereby the coil windings also ascend in the step-like fashion away from the interior side of the housing toward the bottom wall of the coolant assembly.

2. The charging pad of claim 1 further comprising:
an electronics assembly configured to convert the power wirelessly received by the magnetics assembly into electrical power for charging the electric vehicle, the electronics assembly arranged adjacent the top wall of the coolant assembly for heat generated by the electronics assembly to thermally conduct from the top wall into coolant in the coolant channel.

3. The charging pad of claim 1 wherein:
the top wall and the bottom wall are of thermally conductive plastic.

4. A charging pad comprising:
a coolant assembly having a first wall and a second wall with a coolant channel formed between the first wall and the second wall, the coolant channel for circulating coolant through the coolant assembly;
a module having a housing, a magnetics assembly, and potting material, the housing having an open-ended side and an interior side, the interior side spaced apart from and facing the open-ended side, the interior side including a plurality of tracks thereon facing toward the open-ended side, the tracks being concentric tracks having a common center and ascending, outward relative to the common center, in a step-like fashion away from the interior side and toward the open-ended side, the magnetics assembly including an induction coil arrangement having a plurality of coil windings, the magnetics assembly arranged within the housing and attached to and placed directly on the interior side of the housing with the coil windings being received in the tracks on the interior side of the housing and thereby the coil windings also ascending in the step-like fashion away from the interior side and toward the open-ended side with a step-like varied amount of empty space being between the coil windings and the open-ended side, the potting material filling in the empty space between the coil windings and the open-ended side;
the module with the magnetics assembly attached to and placed directly on the interior side of the housing is connectable to the coolant assembly; and
wherein the module is connected to the coolant assembly by the housing being connected to the coolant assembly with the open-ended side meeting the first wall of the coolant assembly whereby the first wall of the coolant assembly acts as a side of the housing, the interior side is spaced apart from and faces the first wall of the coolant assembly, the tracks on the interior side with the coil windings received therein ascend in the step-like fashion away from the interior side and toward the first wall of the coolant assembly, and the magnetics assembly is adjacent the first wall of the coolant assembly for heat generated by the magnetics assembly to thermally conduct through the potting material to the first wall and into coolant in the coolant channel.

5. The charging pad of claim 4 further comprising:
an electronics assembly, the electronics assembly arranged adjacent the second wall of the coolant assembly for heat generated by the electronics assembly to thermally conduct from the second wall into coolant in the coolant channel.

6. The charging pad of claim 5 wherein:
the magnetics assembly is configured to wirelessly receive power from a charging source and the electronics assembly is configured to convert the power wirelessly received by the magnetics assembly into electrical power.

7. The charging pad of claim 5 further comprising:
an electromagnetic shield between at least one of the first wall of the coolant assembly and the magnetics assembly and the second wall of the coolant assembly and the electronics assembly.

8. The charging pad of claim 5 wherein:
the electronics assembly is attached to the second wall of the coolant assembly.

9. The charging pad of claim 5 wherein:
the electronics assembly includes a printed circuit board having electric and electronic components arranged thereon and a thermal interface layer, the thermal interface layer being arranged between the second wall of the coolant assembly and the printed circuit board.

10. The charging pad of claim 4 further comprising:
an electromagnetic shield between the first wall of the coolant assembly and the magnetics assembly.

11. The charging pad of claim 4 wherein:
the coolant assembly further includes a coolant inlet for coolant to enter into the coolant channel and a coolant outlet for coolant to exit out of the coolant channel.

12. The charging pad of claim 4 wherein:
the first wall and the second wall are of thermally conductive plastic.

13. A charging pad for an electric vehicle, comprising:
a coolant assembly having a top wall and a bottom wall with a coolant channel formed between the top wall and the bottom wall, the coolant channel for circulating coolant through the coolant assembly;
a module having a housing, a magnetics assembly, and potting material, the housing having an open-ended side and an interior side, the interior side spaced apart from and facing the open-ended side, the interior side including a plurality of tracks thereon facing toward the open-ended side, the tracks being concentric tracks having a common center and ascending, outward relative to the common center, in a step-like fashion away from the interior side and toward the open-ended side, the magnetics assembly configured to wirelessly receive power from a charging source induction coil arrangement facing the magnetics assembly, the magnetics assembly including an induction coil arrangement having a plurality of coil windings, the magnetics assembly arranged within the housing and attached to and placed directly on the interior side of the housing with the coil windings being received in the tracks on the interior side of the housing and thereby the coil windings also ascending in the step-like fashion away from the interior side and toward the open-ended side with a step-like varied amount of empty space being between the coil windings and the open-ended side, the potting material filling in the empty space between the coil windings and the open-ended side;

the module with the magnetics assembly attached to and placed directly on the interior side of the housing is connectable to the coolant assembly;

wherein the module is connected to the coolant assembly by the housing being connected to the coolant assembly with the open-ended side meeting the bottom wall of the coolant assembly whereby the bottom wall of the coolant assembly acts as a side of the housing, the interior side is spaced apart from and faces the bottom wall of the coolant assembly, the tracks on the interior side with the coil windings received therein ascend in the step-like fashion away from the interior side and toward the bottom wall of the coolant assembly, and the magnetics assembly is adjacent the bottom wall of the coolant assembly for heat generated by the magnetics assembly to thermally conduct through the potting material to the bottom wall and into coolant in the coolant channel; and an electronics assembly configured to convert the power wirelessly received by the magnetics assembly into electrical power for charging the electric vehicle, the electronics assembly arranged adjacent the top wall of the coolant assembly for heat generated by the electronics assembly to thermally conduct from the top wall into coolant in the coolant channel.

14. The charging pad of claim 13 further comprising:

an electromagnetic shield between at least one of the bottom wall of the coolant assembly and the magnetics assembly and the top wall of the coolant assembly and the electronics assembly.

15. The charging pad of claim 13 wherein:

the top wall and the bottom wall are of thermally conductive plastic or metal.

16. The charging pad of claim 13 wherein:

the electronics assembly is attached to the top wall of the coolant assembly.

17. The charging pad of claim 13 wherein:

the electronics assembly includes a printed circuit board having electric components arranged thereon and a thermal interface layer, the thermal interface layer being arranged between the top wall of the coolant assembly and the printed circuit board.

* * * * *